United States Patent Office 2,703,318
Patented Mar. 1, 1955

2,703,318

STABILIZED SULFUR-CONTAINING ADDITIVES FOR LUBRICANTS

Walter E. Waddey, Roselle, James M. Phelan, Cranford, and Dilworth T. Rogers, Summit, N. J., assignors to Esso Research and Engineering Company, a corporation of Delaware No Drawing. Application December 16, 1950,
Serial No. 201,232

18 Claims. (Cl. 260—97.5)

The present invention relates to stabilized sulfur-containing additives for lubricants and related compositions. It relates more particularly to products of animal and vegetable derivation such as the sulfurized and/or phospho-sulfurized natural oils, fats, resins, etc., their immediate organic acid and ester derivatives, and the corresponding hydrogenated, methylated and ethylated derivatives thereof. It is applicable also to the sulfurized hydrocarbons, sulfurized chlorinated hydrocarbons, etc.

As is well known in the prior art, various fatty oils, acids, esters and the like have been treated with sulfur or with phosphorus sulfide, and in some cases with both, to produce additives which are useful in lubricating compositions. Products such as sulfurized sperm oil, phosphorus sulfide treated rosin, rosin derivatives such as methyl abietate and the like, for example, the products sold under the trade name "Abalyn," "Hercolyn" and the like, as well as various sulfur and/or phosphorus-sulfide treated acids, methyl esters, etc., derived from these products and from lanolin, degras, tall oil, etc., are well known in the lubricating industry.

In particular, products of the general character mentioned above have been treated with $H_2S$, sulfur, or other sulfurizing materials or with phosphorus sulfide, or both, to incorporate sulfur and/or phosphorus into them. In general, these products contain appreciable proportions of sulfur which tends to impart oxidation inhibiting properties and also confers upon them other desirable properties, such as load carrying capacity when added to lubricants, and the like.

Numerous examples of the products to which the present invention is applicable are known in the prior art; among them such extreme pressure lubricating compositions as sperm oil treated with sulfur and with phosphorus pentasulfide as described in U. S. Patent 2,468,520, the rosin derivatives "Abalyn" and "Hercolyn" similarly treated as mentioned above, sulfurized and phospho-sulfurized degras, and, in general, most of the common oils and fats of animal and vegetable origin.

In treating products such as those mentioned above with sulfur to incorporate an active sulfur constituent into the molecule, it has been found difficult in the past to obtain an optimum degree of stability. The sulfur which is so incorporated into the molecule should be reasonably active to perform its intended function but it must not be so active as to be easily removed in the form of $H_2S$ on storage at ordinary or moderately elevated temperatures. Many of the sulfur-containing compounds of the prior art have been seriously objectionable in this particular respect. When $H_2S$ gas is evolved, while a lubricant is in use serious metal corrosion problems may arise, aside from the objectionable odor of this gas.

According to the present invention, sulfur-containing products of the character mentioned above are effectively stabilized by cooking them with suitable proportions, preferably from 0.02 to 1 part by weight, of a suitably active olefinic hydrocarbon, based on the weight of the treated material. By "suitably active" is meant the property of reacting with the loosely bound sulfur in the sulfur-containing product so as to take it up and stabilize the composition.

The preferred hydrocarbon materials to be reacted with the sulfur-containing products are the terpenes, such as turpentine, dipentene, alpha pinene, terpinene, terpineol, and the like, but other olefinic hydrocarbons such as isobutylene, diisobutylene and the more reactive of the analogous aliphatic and cyclo aliphatic materials may be used.

In particular, a product sold commercially as "Dipentene" consisting of a mixture of true dipentene with its isomers and related products, is used in proportions of about 0.02 to 1 part by weight based on the material to be treated, the ingredients being mixed together and heated at a suitable temperature until the product is stabilized. Preferred proportions are 0.05 to 0.2 part or 5 to 20% by weight. Stability is indicated by a lack of evolution of $H_2S$ gas at ordinary temperatures and at moderately elevated temperatures such as 150° or even up to 400° F. The cooking temperature and the time required for cooking will vary depending upon the particular ingredients and upon the degree of stability required. In general the invention contemplates a range of cooking temperature from as low as 60° to as high as about 400° F. For the usual sulfur-containing products, such as sulfurized sperm oil, sulfurized lard oil and the like, the preferred cooking temperature range is between 200 and 300° F. The cooking time in the latter case may be from 1 to 10 hours, depending upon the tendency to evolve the $H_2S$ gas and upon the degree of stability desired. More broadly, the time required for cooking may be as little as one-quarter of an hour to as much as 20 hours. When the higher temperature range for treatment, e. g. up to 400° F., is employed, the cooking time is, of course, quite short. For a moderate cooking temperature, in the range of 200° to 300° F., a longer cooking time obviously is necessary.

Examples

A number of different sulfur-containing materials were treated with 10 weight per cent of dipentene for a period of one hour at 250° F. and allowed to cool to room temperature while blowing with nitrogen. The materials treated in this manner along with samples of the untreated materials were tested for $H_2S$ evolution during storage at room temperature. Data are given in the following table.

| Example | Lead Acetate Paper-Rating [1] | |
|---|---|---|
| | Initial | After Storage |
| I. Phospho-sulfurized Sperm Oil (0.5% P, 6% S). | 10 | 10 (34 days). |
| I. Treated as above | 0 | 3 (34 days). |
| II. Sulfur-chlorinated Wax Kerosene Mixture (6% S, 30% Cl). | 10 | 10 (34 days). |
| II. Treated as above | 0 | 2 (34 days). |
| III. Sulfurized Sperm Oil (6% S) | 10 | 10 (7 days). |
| III. Treated as above | 0 | 4 (7 days). |
| IV. Sulfurized Dipentene (ca. 23% S) | 10 | 10 (7 days). |
| IV. Treated as above | 0 | 4 (7 days). |

[1] Filter paper saturated with 5% aqueous lead acetate solution and placed on mouth of bottle for one minute. Rating from "0" no stain, to "10" for black stain. $H_2S$ odor not generally perceptible below rating of "7."

It will be noted from the data in the above table that the treatment of the sulfurized materials with dipentene resulted in products of greatly increased stability. It will also be noted that the improvement was evident after storage for considerable periods of time as well as for shorter periods. Similar results are obtained with alpha pinene, another commercially available terpene. Other unsaturated compounds may be used, as previously indicated. It will be understood that the olefins used need not be chemically pure and reference to specific olefins or terpenes, such as dipentene or alpha pinene means that, unless otherwise stated, the reactant materials consist predominantly of such compounds. Obviously they may, and the products of commerce ordinarily do, contain homologous and related materials which appear to be equally useful for purposes of the present invention.

In summary, the invention resides in the treatment of the sulfur-containing product with a sufficiently reactive olefin to increase the stability against $H_2S$ gas evolution at moderate temperatures. In fact the stability is increased also at higher temperatures, up to 400° F. The products of this invention are characterized by their relative freedom from corrosivity toward various metals, especially copper, and by their freedom from H₂S gas evolution under the conditions where lubricants are employed.

It is intended, of course, that the products of this invention, suitably stabilized as indicated above, may be used in lubricants, i. e. lubricating oils, greases, etc., in the usual proportions. For example, extreme pressure additives will be incorporated into mineral oils of suitable viscosity where gear oils of high load capacity are required. Proportions in this case may range from 1 to 10% of the weight of the total lubricant, or more. In other compositions where the function of the sulfurized additive is to prevent oxidation, or to inhibit other chemical action, the proportions may be much smaller; for example, as little as 0.01 to 1% or more based on the weight of the total lubricant.

As will be understood by those skilled in the art, these products may be used in synthetic lubricants as well as mineral base lubricants. They have utility in lubricating greases as well as in oils of various viscosities. They may be combined with other conventional additives such as oxidation inhibitors, viscosity index improvers, pour point depressants, extreme pressure additives, greases, cutting oils, and the like.

In the following claims it is intended to cover the individual fats, oils, etc., mentioned above, and to cover these treated materials whether treated only with sulfur or treated only with a phosporus sulfide such as $P_2S_5$, $P_4S_3$, $P_4S_7$, etc. The sulfurized products may be sulfurized with $H_2S$, with alkali metal polysulfides, or with any other known sulfurizing agents, and with or without catalyst and/or promoters such as "Captax," "Tuads," and the other and various sulfurization accelerators and modifiers used in the oil and rubber industries and in related processes and procedures.

What is claimed is:

1. A stable sulfur-containing organic product comprising a sulfurized member selected from the group consisting of animal and vegetable oils, fats, rosins, and the acid, ester, hydrogenated and lower alkyl derivatives thereof, said product being stabilized by cooking after sulfurization with 0.02 to 1 part by weight, based on the sulfurized material, of an active olefinic hydrocarbon at a temperature within the range of 60° to 400° F. for one-fourth to 20 hours.

2. Products according to claim 1 wherein said sulfurized member is phospho-sulfurized.

3. A stable sulfur-containing organic product comprising a sulfurized member selected from the group consisting of animal and vegetable oils, fats, rosins, and the acid, ester, hydrogenated and lower alkyl derivatives thereof, said product being stabilized by heating it with 0.02 to 1 part by weight, based on said sulfurized composition, of a chemically active unsaturated non-aromatic hydrocarbon at a temperature within the range of 60° to 400° F. for a period of one-fourth to 20 hours.

4. The process of stabilizing sulfurized organic products selected from the group consisting of animal and vegetable oils, fats, rosins, and the acid, ester, hydrogenated and lower alkyl derivatives thereof, said process consisting in heating said product with 0.02 to 1 part by weight, based on the sulfurized material, of a chemically active olefin at a temperature within the range of 60° to 400° F. for a period of one-fourth to 20 hours and until said product is substantially stabilized as indicated by a definite reduction in H₂S evolution when heating to temperatures of the range of 150° to 400° F.

5. Process according to claim 4 wherein said sulfurized organic products are phospho-sulfurized.

6. Process according to claim 4 wherein said olefin is a terpene.

7. Process according to claim 4 wherein said olefin is a monocyclic terpene.

8. Process according to claim 4 wherein said olefin is dipentene.

9. Process according to claim 4 wherein said olefin is alpha pinene.

10. The process of stabilizing sulfurized organic products selected from the group consisting of animal and vegetable oils, fats, rosins, and the acid, ester, hydrogenated and lower alkyl derivatives thereof, which comprises cooking said products with 0.02 to 1 part by weight, based on said product, of a terpene, at a temperature within the range of 60° to 400° F. for a period of one-fourth to 20 hours.

11. Process according to claim 10 wherein the cooking temperature is between 200° and 300° F. and the cooking time is between 1 and 10 hours.

12. A stable sulfur-containing organic product comprising a sulfurized member selected from the group consisting of animal and vegetable oils, fats, rosins and the acid, ester, hydrogenated and lower alkyl derivatives thereof, said product being stabilized by cooking with 0.2 to 1 part by weight, based on the sulfurized material, of a terpene at a temperature of 60° to 400° F. for one-fourth to 20 hours.

13. Product according to claim 12 wherein said sulfur-containing product is tall oil treated with a phosphorus sulfide.

14. Product according to claim 12 wherein said sulfur-containing product is a rosin acid.

15. Product according to claim 12 wherein said sulfur-containing product is a phosphorus-sulfide treated animal fat.

16. Product according to claim 12 wherein said sulfur-containing product is a phosphorus-sulfide treated sperm oil.

17. Product according to claim 12 wherein said terpene is predominantly dipentene.

18. Product according to claim 12 wherein said terpene is predominantly alpha pinene.

References Cited in the file of this patent

UNITED STATES PATENTS

| Number | Name | Date |
|---|---|---|
| 2,394,735 | Yule | Feb. 12, 1946 |
| 2,497,097 | Roberts | Feb. 14, 1950 |
| 2,537,297 | Alexander | Jan. 9, 1951 |
| 2,568,648 | McColl | Sept. 18, 1951 |
| 2,572,737 | Manteuffel et al. | Oct. 16, 1951 |